United States Patent
Komatsu et al.

(10) Patent No.: US 10,003,244 B2
(45) Date of Patent: Jun. 19, 2018

(54) SQUIRREL-CAGE ROTOR AND METHOD FOR MANUFACTURING SQUIRREL-CAGE ROTOR

(71) Applicant: MITSUBISHI ELECTRIC CORPORATION, Chiyoda-ku (JP)

(72) Inventors: Taiga Komatsu, Chiyoda-ku (JP); Moriyuki Hazeyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 359 days.

(21) Appl. No.: 14/912,355

(22) PCT Filed: May 30, 2014

(86) PCT No.: PCT/JP2014/064431
§ 371 (c)(1),
(2) Date: Feb. 16, 2016

(87) PCT Pub. No.: WO2015/029529
PCT Pub. Date: Mar. 5, 2015

(65) Prior Publication Data
US 2016/0204684 A1 Jul. 14, 2016

(30) Foreign Application Priority Data

Sep. 2, 2013 (JP) .................. 2013-181037

(51) Int. Cl.
*H02K 17/16* (2006.01)
*H02K 15/00* (2006.01)
*H02K 17/20* (2006.01)

(52) U.S. Cl.
CPC ....... *H02K 17/165* (2013.01); *H02K 15/0012* (2013.01); *H02K 17/205* (2013.01); *H02K 2213/03* (2013.01)

(58) Field of Classification Search
CPC .................. H02K 17/16–17/205; H02K 15/00
See application file for complete search history.

(56) References Cited

FOREIGN PATENT DOCUMENTS

| JP | 7-274457 A | 10/1995 |
|---|---|---|
| JP | 2001-37127 A | 2/2001 |
| JP | 2003-259579 A | 9/2003 |
| JP | 2009-153307 A | 7/2009 |
| JP | 2011-166865 A | 8/2011 |

OTHER PUBLICATIONS

International Search Report dated Aug. 12, 2014 in PCT/JP2014/064431 filed on May 30, 2014.

*Primary Examiner* — Ramon M Barrera
(74) *Attorney, Agent, or Firm* — Oblon, McClelland, Maier & Neustadt, L.L.P.

(57) ABSTRACT

A squirrel-cage rotor including a rotor which has a plurality of rotor slots on an outer circumferential portion thereof and in which secondary conductors accommodated in the rotor slots rotate freely inside a stator as a result of interaction with a rotating magnetic field formed by the stator. The plurality of rotor slots has the same shape and size, and an arrangement spacing thereof with respect to the rotation direction of the rotor is made uneven within a slot uneven arrangement period $(360/(a))°$ obtained by equally dividing one rotation period of the rotor by a divisor (a) of a number p of poles in the stator.

7 Claims, 9 Drawing Sheets

SQUIRREL-CAGE ROTOR AND METHOD FOR MANUFACTURING SQUIRREL-CAGE ROTOR

TECHNICAL FIELD

The present invention relates to an induction machine using a squirrel-cage rotor, and more particularly to a squirrel-cage rotor that excels in quietness and makes it possible to reduce vibrations of the induction machine, and also relates to a method for manufacturing the squirrel-cage rotor.

BACKGROUND ART

In a conventional induction machine using a squirrel-cage rotor, the difference in a starting torque caused by an input phase and a rotor position is reduced and adjusted and motor efficiency is increased by arranging the rotor slots densely close to the magnet center axis of the rotor (see, for example, PTL 1).

In another conventional induction machine using a squirrel-cage rotor, the induction machine is reduced in size and starting characteristics thereof are improved by arranging conductors only in a region where a permanent magnet is present in the rotor (see, for example, PTL 2).

CITATION LIST

Patent Literature

[PTL 1]
Japanese Patent Application Laid-open No. 2009-153307
[PTL 2]
Japanese Patent Application Laid-open No. 2003-259579

SUMMARY OF INVENTION

Technical Problem

However, the following problem is associated with the conventional techniques. Vibrations in an induction machine are apparently generated by a resonance of an electromagnetic excitation force acting between the induction machine rotor and stator and the induction machine housing. In Patent Document 1 and Patent Document 2, the positions of rotor slots are established with reference to the position of the magnet in the rotor, but with such a method, only a specific resonance frequency component of the electromagnetic excitation force of the induction machine can be reduced. The resultant problem is that the effect of reducing the induction machine vibrations is limited.

The present invention has been created to resolve the above-described problems, and it is an objective of the present invention to provide a squirrel-cage rotor which excels in quietness and makes is possible to reduce the induction machine vibrations, and also provide a method for manufacturing the squirrel-cage rotor.

Solution to Problem

A squirrel-cage rotor in accordance with the present invention includes a rotor which has a plurality of rotor slots on an outer circumferential portion thereof and in which secondary conductors accommodated in the rotor slots rotate freely inside a stator as a result of interaction with a rotating magnetic field formed by the stator, wherein the plurality of rotor slots has the same shape and size, and an arrangement spacing thereof with respect to a rotation direction of the rotor is made uneven within a slot uneven arrangement period $(360/(a))°$ obtained by equally dividing one rotation period of the rotor by a divisor (a) of a number p of poles in the stator.

A method for manufacturing the squirrel-cage rotor in accordance with the present invention includes: a step of storing in advance in a storage unit an uneven arrangement spacing of the plurality of rotor slots formed on an outer circumferential portion of the stator; a step of arranging a rotor core in a state before the plurality of rotor slots are formed, at an initial position with respect to a mold; a one slot formation step of forming one of the rotor slots in the rotor core by using the mold; a rotor core rotation step of rotating the rotor core through an angle corresponding to an arrangement spacing between the rotor slot which has been formed in the one slot formation step and the rotor slot which is next to be formed, on the basis of the uneven arrangement spacing stored in the storage unit; and a step of repeating the one slot formation step and the rotor core rotation step through one rotation of the rotor core.

Advantageous Effects of Invention

In accordance with the present invention, the arrangement spacing of the rotor slots with respect to the rotation direction of the rotor is made uneven within the slot uneven arrangement period $(360/(a))°$ obtained by equally dividing one rotation period of the rotor by the divisor (a) of the number p of poles in the stator. As a result, it is possible to obtain a squirrel-cage rotor which excels in quietness and makes is possible to disperse spatial order components of the radial excitation force between the rotor and stator and reduce the induction machine vibrations and also to obtain a method for manufacturing the squirrel-cage rotor.

DESCRIPTION OF EMBODIMENTS

Figure 1:
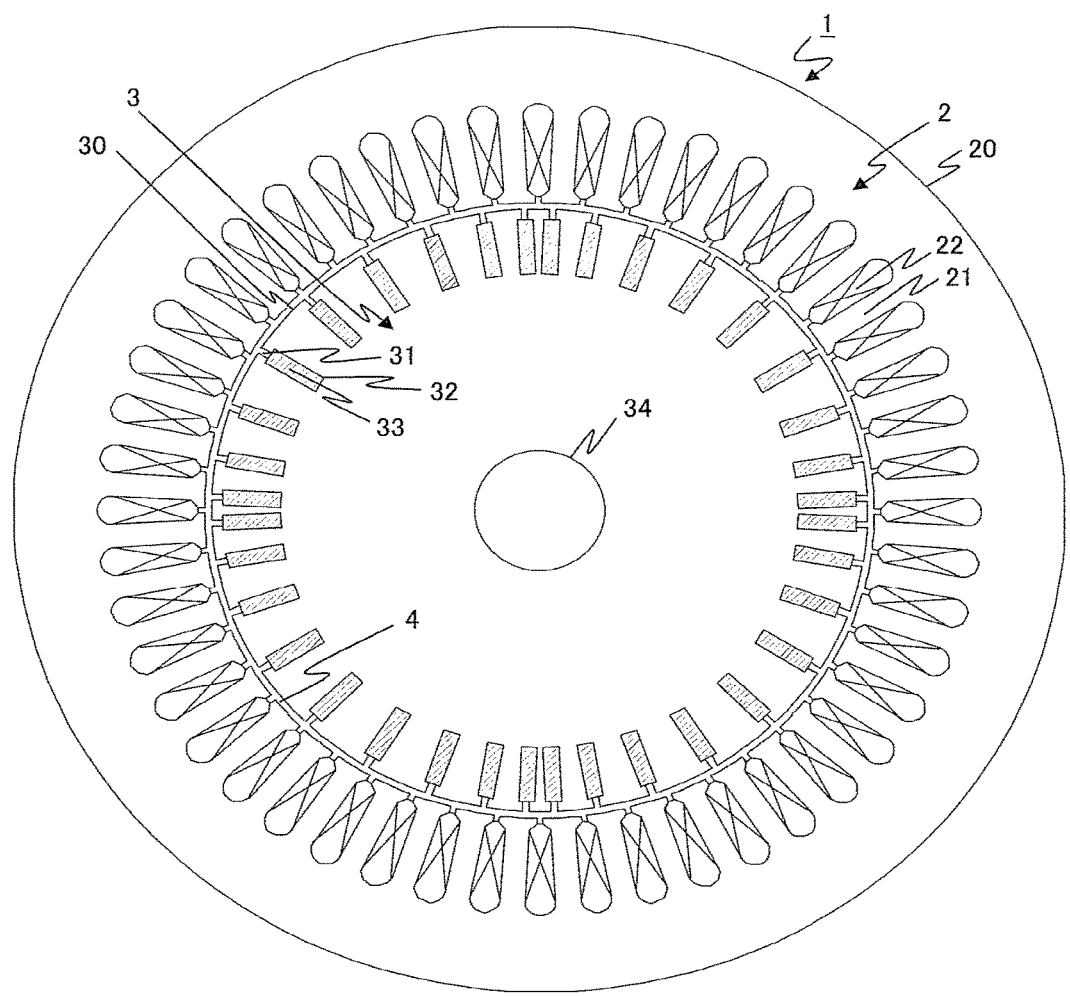
FIG. 1 is a cross-sectional exemplary view of the induction machine using the rotor according to Embodiment 1 of the present invention.

The preferred embodiments of the squirrel-cage rotor and a method for manufacturing a squirrel-cage rotor in accordance with the present invention will be explained hereinbelow with reference to the appended drawings. In the drawings, the same or corresponding parts are assigned with the same reference numerals.

Embodiment 1

Initially the structure of an induction machine 1 according to Embodiment 1 is explained. FIG. 1 is a cross-sectional exemplary view of the induction machine 1 using a rotor 3 according to Embodiment 1 of the present invention. The induction machine 1 depicted in FIG. 1 is constituted by a stator 2 and the rotor 3. The induction machine 1 is suitable as a drive motor, for example, for electric automobiles and hybrid vehicles.

The stator 2 has a stator iron core 20 having a cylindrical shape. A plurality (Ns) of stator teeth 21 is formed with an equiangular pitch and intermittently on the inner circumferential portion of the stator iron core 20. As a result, stator slots 22, which are equal in number (Ns) to the stator teeth 21 are formed between the adjacent stator teeth 21. A stator coil (not depicted in the figure) is wound and accommodated in the stator slots 22 to include inside thereof sections of a predetermined number of stator teeth 21.

Meanwhile, the rotor 3 has a rotor iron core 30 which is fabricated, for example, by laminating and integrating a predetermined number of magnetic steel sheets. The outer circumferential surface of the rotor iron core forms a cylindrical surface. A plurality (Nr) of rotor slots 32 of the same shape and size are formed to be arrayed on the outer circumferential portion of the rotor iron core 30. A secondary conductor 33 is accommodated in each rotor slot 32, and a squirrel-cage conductor is configured by short circuiting the axial ends of the secondary conductors 33 with a short-circuiting ring (not depicted in the figure). The rotor 3 is also provided with a shaft orifice 34, and the outer circumferential surface of the rotor 3 is arranged to face the inner circumferential surface of the stator 2, with a rotation gap 4 therebetween, so as to enable the rotor to rotate freely.

In the induction machine 1 of Embodiment 1, it is assumed that the number Ns of the stator slots 22 is 48, the number Nr of the rotor slots 32 is 36, and the number p of poles of magnetic field formed by the stator 2 is 8, but Ns, Nr, and the number p of poles are not limited to those numbers.

Figure 2:
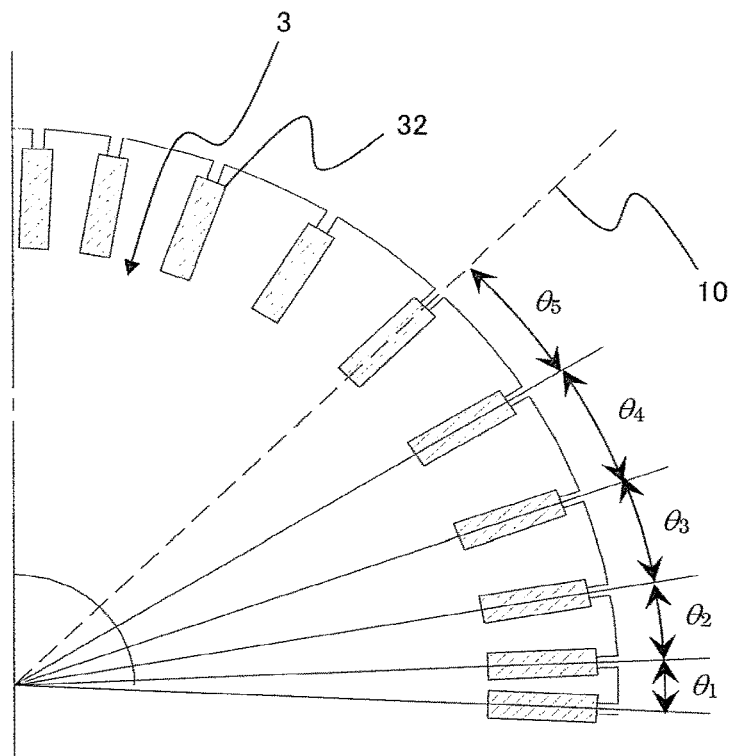
FIG. 2 is an example of a schematic cross-sectional view of the structure of the rotor according to Embodiment 1 of the present invention.
Figure 3:
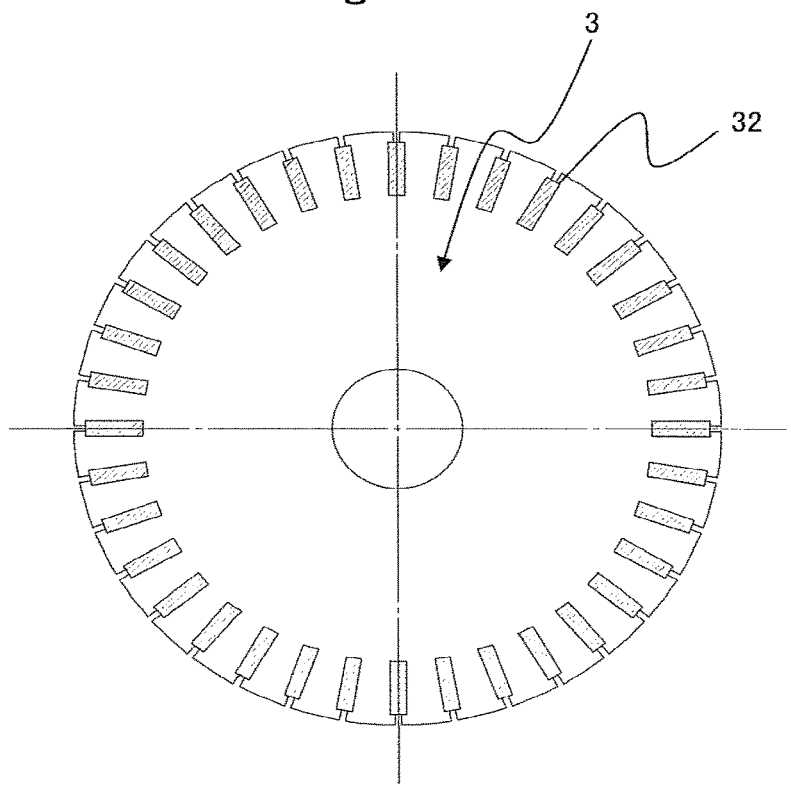
FIG. 3 is a cross-sectional exemplary view of the conventional rotor.

The structure of the rotor 3 of the induction machine 1 of Embodiment 1 will be described hereinbelow in greater detail. FIG. 2 is an example of a schematic cross-sectional view of the structure of the rotor 3 according to Embodiment 1 of the present invention. FIG. 3 is a cross-sectional exemplary drawing of the conventional rotor 3. In the conventional rotor 3 depicted in FIG. 3, the arrangement spacing of the rotor slots 32 is even, whereas the specific feature of the rotor 3 depicted in FIG. 2 is that the arrangement spacing of the rotor slots 32 is uneven.

More specifically, in the rotor 3 of Embodiment 1 depicted in FIG. 2, the arrangement spacing of the rotor slots 32 is uneven within a slot uneven arrangement period $(360/(a))°$ obtained by equally dividing one rotation period of the rotor 3 by a divisor (a) of the number p of poles in the stator 2. Where the number of poles p=8, four (1, 2, 4, 8) divisors (a) thereof can be considered, but in Embodiment 1, it is assumed that the divisor (a)=4, that is, the slot uneven arrangement period is 90°, as depicted in FIG. 2. Furthermore, the rotor slots 32 are arranged to be mirror symmetrical with respect to a plane that passes through a slot arrangement center line 10 representing the angular center of the slot uneven arrangement period and extends in the direction perpendicular to the paper sheet.

More specifically, in FIG. 2, where the arrangement spacing (angle) in the rotation direction between the adjacent rotor slots 32 is represented by $\theta\alpha$ ($\alpha=1, 2, \ldots$) from the side farther from the slot arrangement center line 10, the difference between the adjacent angles, that is, the value $(\theta\alpha+1)-(\theta\alpha)$, increases in an approximately constant arithmetic series (for example, $\theta\alpha$ depicted in FIG. 2 increased by about 1° to 2.5° as $\theta1=4.5°$, $\theta2=7.0°$, $\theta3=9.5°$, $\theta4=11.5°$, and $\theta5=12.5°$.

The mechanism of noise generation in the induction machine 1 will be specifically explained hereinbelow under an assumption that the induction machine 1 is a motor. In a load drive mode of the induction machine 1, a radial force (referred to hereinbelow as "radial excitation force") which makes no contribution to the torque is generated in addition to the force in the rotation direction between the stator 2 and the rotor 3.

This radial excitation force has a periodicity with respect to the rotation direction of the rotor 3. When the radial excitation force has a periodicity of $\beta$ ($\beta$ is a natural number) with respect to one circumferential rotation of the rotor 3, $\beta$ is defined as a spatial order of the radial excitation force. Noise of the induction machine 1 is apparently generated by a resonance of vibrations induced by the radial excitation force and a housing (motor frame; not depicted in the figure) of the induction machine 1 at a resonance frequency of the spatial order $\beta$ through the stator iron core 20.

Further, the radial excitation force is generated by interlinking of magnetic fluxes induced in the stator 2 and the rotor 3. Therefore, the spatial order $\beta$ of the radial excitation force can be represented by a spatial order $\beta s$ of the magnetic flux generated in the stator 2 and a spatial order $\beta r$ of the magnetic flux generated in the rotor 3, as in the following Expression (1):

$$\beta=|\beta s \pm \beta r| \quad (1)$$

Since the magnetic flux generated in the stator 2 or the rotor 3 is represented by the product of a magnetomotive force and a permeance in the slot portion, the spatial order $\beta s$ and the spatial order $\beta r$ can be represented by using the number Ns of the stator slots 22, the number Nr of the rotor slots 32, and the number p of poles with the following Expression (2)

$$\beta s=|As \cdot Ns \pm p/2| \qquad (2)$$

$$\beta r=|Ar \cdot Nr \pm p/2| \qquad (3)$$

where As and Ar are arbitrary integers.

Therefore, the spatial order β can be represented by following Expression (4) on the basis of Expressions (1) to (3):

$$\beta=|As \cdot Ns+Ar \cdot Nr+k \cdot p|(k=-1,0,1) \qquad (4)$$

Generally, the frequency response of the housing of the induction machine 1 which is the cause of noise in the induction machine 1 tends to increase easier at a low spatial order β of the radial excitation force. Therefore, reducing the component with a minimum value βmin of the spatial order β corresponding to the minimum natural number among the spatial orders β of the radial excitation force, which are represented by Expression (4) above, is an effective method for increasing the quietness of the induction machine 1.

Further, βmin, which is the minimum value of the spatial order β, is always a divisor of the number p of poles. For example, the spatial order β in the case of (Ns, Nr, p)=(48, 36, 8) has a minimum value βmin=4 when (As, Ar, k) (1, −1, −1), which is certainly a divisor of the number of poles equal to 8.

As another example, the spatial order β in the case of (Ns, Nr, p)=(36, 38, 6) has a minimum value βmin=2 when (As, Ar, k)=(2, −2, 1), which is certainly a divisor of the number of poles equal to 6. The same is true with respect to other combinations of (Ns, Nr, p).

Therefore, where the divisor of the number p of poles of the rotor 3 is denoted by (a), the radial excitation force generated in the induction machine 1 apparently can be reduced by imparting the periodicity of the divisor (a) times with respect to the circumferential direction of the rotor 3 in relation to the slot permeance.

Assuming that a periodicity other than (a) times is imparted, the slot permeance component generated by the rotor slot arrangement can be classified into two below-described cases. Thus, the case in which there is a spatial order component other than an integer multiple of the rotor slot number, and the case in which there is a spatial order component which is an integer multiple of the rotor slot number and other than an (a) multiple. In the former case, the magnetic flux of the spatial order component other than the βr indicated in Expression (3) is generated inside the rotor. Therefore, even though the noise and vibrations which are generated by the resonance of the electromagnetic excitation force and the housing and have been significant at the initial stage can be reduced, since an excitation force having another spatial order can be generated, an electromagnetic excitation force having a spatial order other than the β represented in Expression (4) is generated, and a problem associated with new noise and vibrations can be encountered in a revolution speed region different from that at the initial stage. Further, in the latter case, although the effect of reducing the component other than the electromagnetic excitation force at which vibrations and noise are significant can be obtained, the effect of moderating the component of the electromagnetic excitation force itself, this force causing significant vibrations and noise, can be said to be small. The noise and vibrations typically occurring in an induction machine are generated by comparatively low (first to fourth) spatial orders. Where it is assumed that the periodicity of the rotor slots is an integer multiple of the rotor slot number and other than (a) times, the effect of reducing the electromagnetic excitation force of the high-order spatial order components by the rotor slot arrangement can be confirmed, but it is low-order spatial order components of the electromagnetic excitation force that are associated with significant noise and vibrations, and the effect of reducing noise and vibrations is small even though the high-order spatial order components are reduced. Therefore, it can be said that a significant effect can be demonstrated by imparting the (a)-times periodicity to the rotor slot arrangement. Further, where it is assumed that an electromagnetic excitation force having even lower-order spatial order components is reduced, the same effect can be found to be demonstrated also with the rotor slot arrangement imparting a β-times periodicity.

Accordingly, the present invention suggests to disperse the spatial order components of the radial excitation force which are represented by Expression (4) above. The terms (As·Ns) and (Ar·Nr) that are the first terms in Expressions (2) and (3), which show the spatial orders of magnetic fluxes of the stator 2 and the rotor 3, represent the spatial order components which are specific (larger than other components) among the spatial high-order components of the slot permeance with respect to the rotation direction of the rotor 3. Therefore, by making an uneven arrangement spacing of the rotor slots 32 in the rotation direction of the rotor 3, as depicted in FIG. 2, it is apparently possible to disperse the specific spatial order components of the radial excitation force and reduce the specific noise component.

Figure 4:
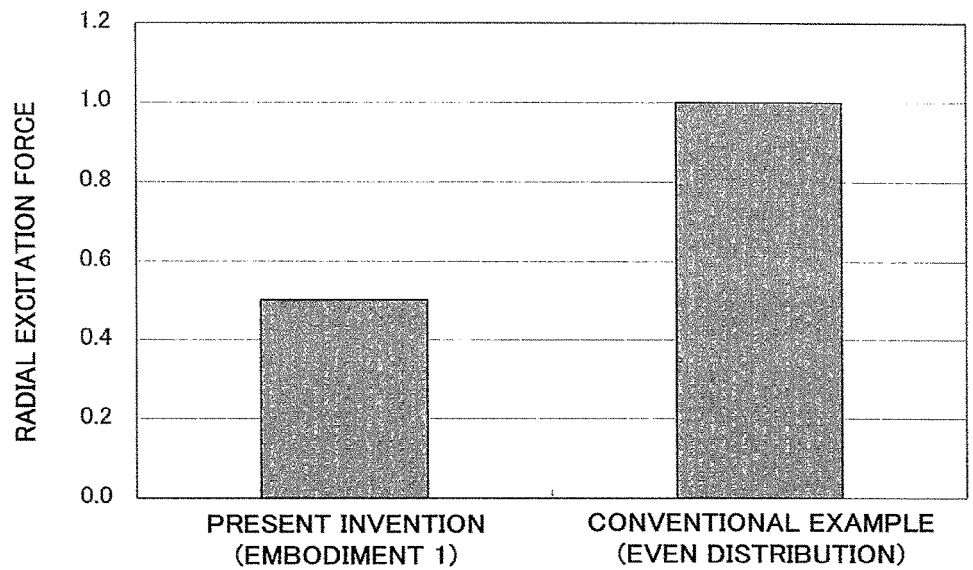
FIG. 4 illustrates the comparison of the radial excitation force generated when the rotor according to Embodiment 1 of the present invention is driven under a load with the result obtained with the conventional rotor.

An electromagnetic field analysis is used hereinbelow to illustrate the effect obtained with the rotor 3 of Embodiment 1 in comparison with the conventional rotor. FIG. 4 illustrates the comparison of the radial excitation force generated when the rotor 3 according to Embodiment 1 of the present invention is driven under a load with the result obtained with the conventional rotor.

FIG. 4 shows the values of the radial excitation force generated in the rotors 3 when the rotors are driven under a load at the same revolution speed and under the same torque conditions. In FIG. 4, the value of the radial excitation force obtained with the rotor 3 of Embodiment 1 is shown on the left side and that obtained with the conventional rotor 3 is shown on the right side. In this case, the rotor slots 32 in the rotor 3 of Embodiment 1 are assumed to increase approximately arithmetically, as depicted in FIG. 2. Meanwhile, the conventional rotor 3 is assumed to have even spacing of the rotor slots 32 such as depicted in FIG. 3. Other conditions, such as the shape and size of the rotor slots 32, are the same in FIG. 2 and FIG. 3. FIG. 4 confirms that in the rotor 3 of Embodiment 1, the radial excitation force is reduced by about 50% with respect to that of the conventional rotor 3.

As indicted hereinabove, in Embodiment 1, the arrangement spacing of the rotor slots with respect to the rotation direction of the rotor is made uneven within a slot uneven arrangement period (360/(a))° obtained by equally dividing one rotation period of the rotor by the divisor (a) of the number p of poles in the stator. As a result, it is possible to obtain a squirrel-cage rotor which excels in quietness and in which the spatial order components of the radial excitation force between the rotor and stator can be dispersed and induction machine vibrations can be reduced.

Further, in Embodiment 1, a method for changing approximately arithmetically the arrangement spacing of the rotor slots 32 is described as an example of methods for obtaining the uneven arrangement of the rotor slots 32, but in order to reduce the vibrations of the induction machine 1, it is not always necessary to change the arrangement spacing arithmetically, and any uneven arrangement spacing of the rotor slots 32 within the slot uneven arrangement period may be sufficient.

For the same reason, although the arrangement of the rotor slots 32 is mirror symmetrical with respect to the slot arrangement center line 10, which is the angular center of the slot uneven arrangement period, it is not always necessary that the arrangement be mirror symmetrical. Further, the arrangement spacing of the rotor slots 32 decreases monotonously with the angle from the slot arrangement center line 10, but the arrangement spacing may also increase monotonously. Further, in Embodiment 1, the divisor (a)=4 is assumed, but the divisor (a) may be any divisor of the number p of poles and is not limited to the divisor (a)=4.

Embodiment 2

In the above-described Embodiment 1, a method for changing approximately arithmetically the arrangement spacing of the rotor slots 32 with respect to the rotation direction of the rotor 3 is described as an example of methods for obtaining the uneven arrangement of the rotor slots 32. However, as mentioned hereinabove, in order to reduce the vibrations of the induction machine 1, it is not always necessary to change the arrangement spacing arithmetically, and any uneven arrangement spacing of the rotor slots 32 within the slot uneven arrangement period may be sufficient. Embodiment 2 describes another example of methods for obtaining the uneven arrangement spacing of the rotor slots 32 and demonstrates that a squirrel-cage rotor that excels in quietness and makes is possible to reduce the vibrations of the induction machine 1 can be also obtained in the same manner as in Embodiment 1 by changing approximately geometrically the arrangement spacing of the rotor slots 32.

As indicated in Embodiment 1, a method of dispersing the spatial high-order components of slot permeance is effective for reducing the specific spatial order component of the radial excitation force. Embodiment 1 illustrates a method for dispersing the spatial high-order components by changing arithmetically the arrangement spacing of the rotor slots 32, but the same effect can be also obtained with any uneven arrangement spacing of the rotor slots 32, for example, by changing the arrangement spacing geometrically.

Accordingly, in Embodiment 2, for example, the arrangement spacing (angle; denoted by $\theta\alpha(\alpha=1, 2, \ldots)$) between the adjacent rotor slots 32 in the rotation direction, which is depicted in FIG. 2, is made to increase geometrically so that the ratio of the adjacent angles, that is, $(\theta\alpha+1)/(\theta\alpha)$ is approximately constant (for example, the ratio of the adjacent angles is approximately constant, as in the case of $\theta1=2.4°$, $\theta2=4.2°$, $\theta3=7.0°$, $\theta4=11.9°$, and $\theta5=19.5°$. Other features are the same as in Embodiment 1.

Figure 5:
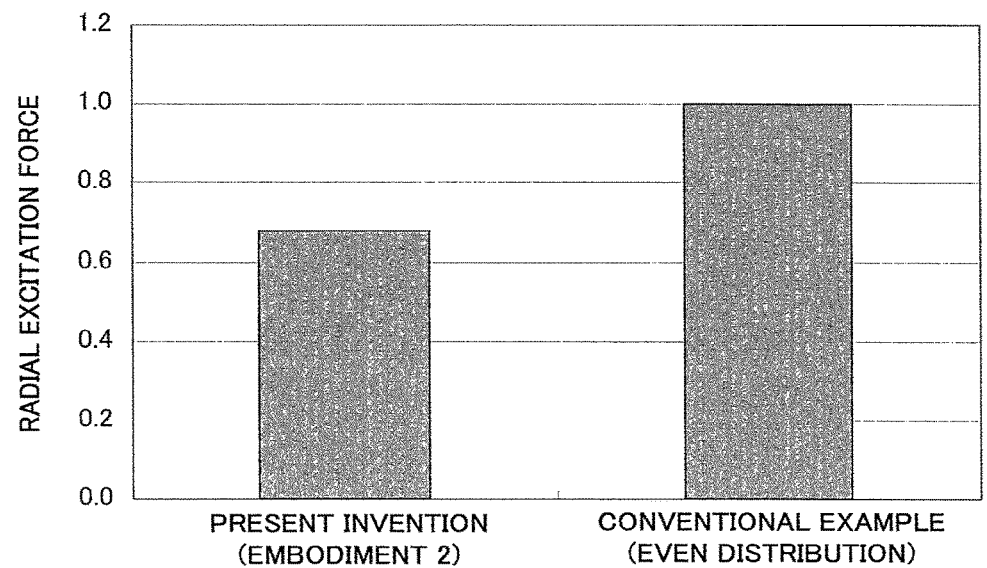
FIG. 5 illustrates the comparison of the radial excitation force generated when the rotor according to Embodiment 2 of the present invention is driven under a load with the result obtained with the conventional rotor.

FIG. 5 illustrates the comparison of the radial excitation force generated when the rotor 3 according to Embodiment 2 of the present invention is driven under a load with the result obtained with the conventional rotor. In FIG. 5, the value of the radial excitation force obtained with the rotor 3 of Embodiment 2 is shown on the left side and that obtained with the conventional rotor 3 is shown on the right side. FIG. 5 confirms that in the rotor 3 of Embodiment 2, the radial excitation force is reduced by about 30% with respect to that of the conventional rotor 3.

As indicated hereinabove, with Embodiment 2, a squirrel-cage rotor that excels in quietness and makes is possible to reduce the vibrations of the induction machine can be also obtained in the same manner as in Embodiment 1 by obtaining an uneven arrangement spacing of the rotor slots by changing geometrically, rather than arithmetically, the arrangement spacing of the rotor slots with respect to the rotation direction of the rotor.

Further, in Embodiment 2, a method for changing approximately geometrically the arrangement spacing of the rotor slots 32 is described as an example of methods for making the uneven arrangement of the rotor slots 32, but as also indicted in the above-described Embodiment 1, in order to reduce the vibrations of the induction machine 1, it is not always necessary to change the arrangement spacing geometrically, and any uneven arrangement spacing of the rotor slots 32 within the slot uneven arrangement period may be sufficient.

Embodiment 3

In Embodiments 1 and 2, the number of poles p=8 is considered by way of example and the case is described in which the divisor (a) is 4, that is, the slot uneven arrangement period is 90°. By contrast, in Embodiment 3, the effect same as that of Embodiments 1 and 2 can be obtained even when the divisor (a) in the case of the number of poles p=8 is other than 4, or when the number Ns of stator slots 22 is not equal to the number Nr of the rotor slots 32, or when the rotor slots 32 have a different symmetry within the slot uneven arrangement period.

As indicated in Embodiment 1, when the divisor of the number p of poles is denoted by (a), the specific component of the radial excitation force can be reduced by making the uneven arrangement spacing of the rotor slots 32 with respect to the rotation direction of the rotor 3 within the slot uneven arrangement period $(360/(a))°$. This effect is not affected by the number Ns of the stator slots 22 or the number Nr of the rotor slots 32.

Figure 6:
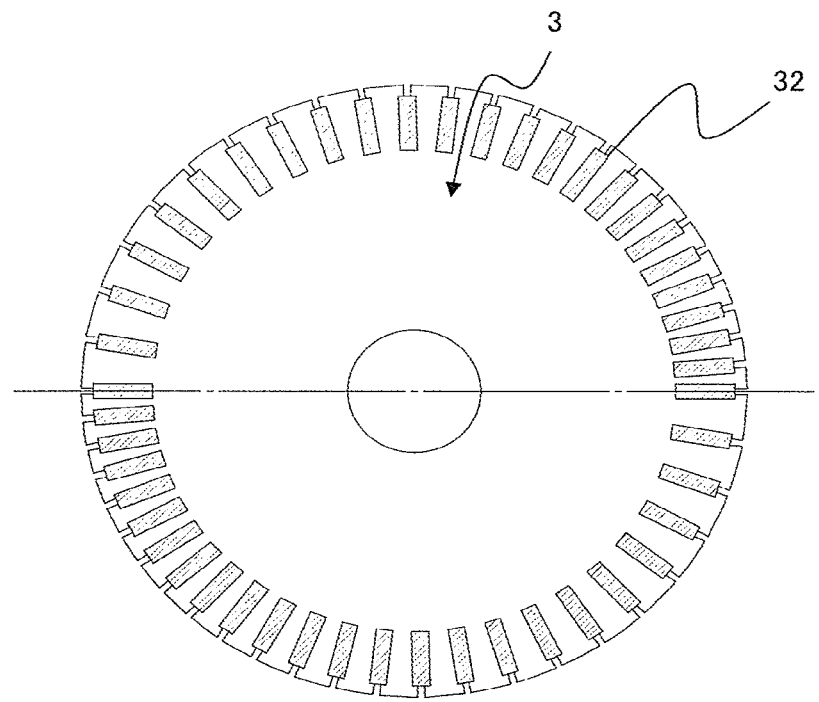
FIG. 6 is a cross-sectional exemplary view of the rotor according to Embodiment 3 of the present invention.
Figure 7:
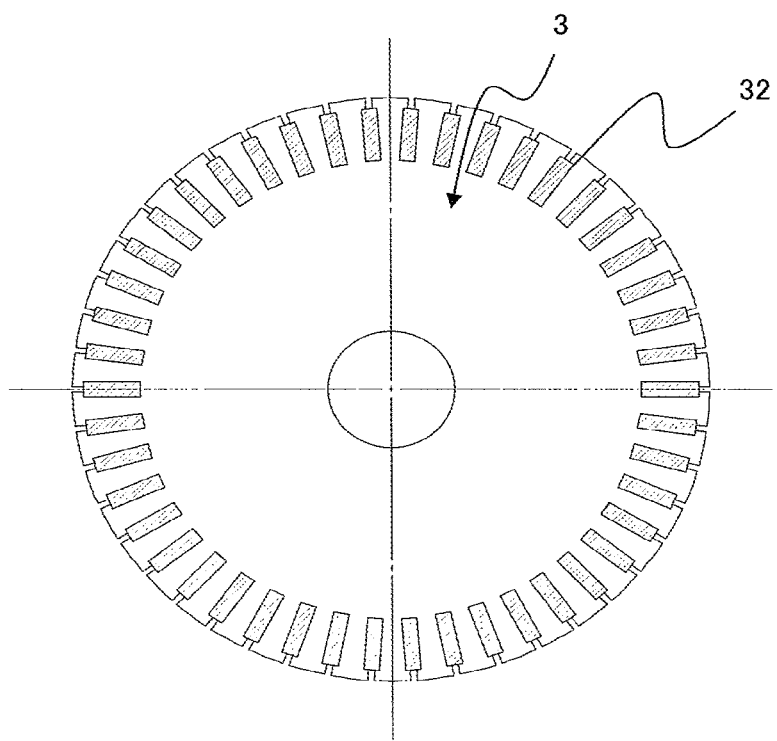
FIG. 7 is a cross-sectional exemplary view of the conventional rotor with the slot uneven arrangement period equal to 180°.

FIG. 6 is a cross-sectional exemplary view of the rotor 3 according to Embodiment 3 of the present invention. FIG. 7 is a cross-sectional exemplary view of the conventional rotor 3 with the slot uneven arrangement period equal to 180°. The rotors 3 depicted in FIG. 6 and FIG. 7 are both assumed to have the number of poles p=8 and the divisor (a)=2. Further, in the rotor 3 depicted in FIG. 6, the arrangement spacing of the rotor slots 32 is made to increase approximately arithmetically in the counterclockwise direction within the slot uneven arrangement period (=180°). Meanwhile, in the rotor 3 depicted in FIG. 7, the rotor slots 32 are arranged with even spacing. Further, in Embodiment 3, the number Ns of the stator slots 22 or the number Nr of the rotor slots 32 are different from those in Embodiments 1 and 2. Other conditions such as the shape and size of the rotor slots 32 are the same in FIG. 6 and FIG. 7. In FIG. 6, the arrangement spacing of the rotor slots 32 increases monotonously in the counterclockwise direction, but the arrangement spacing may also decrease monotonously.

Figure 8:
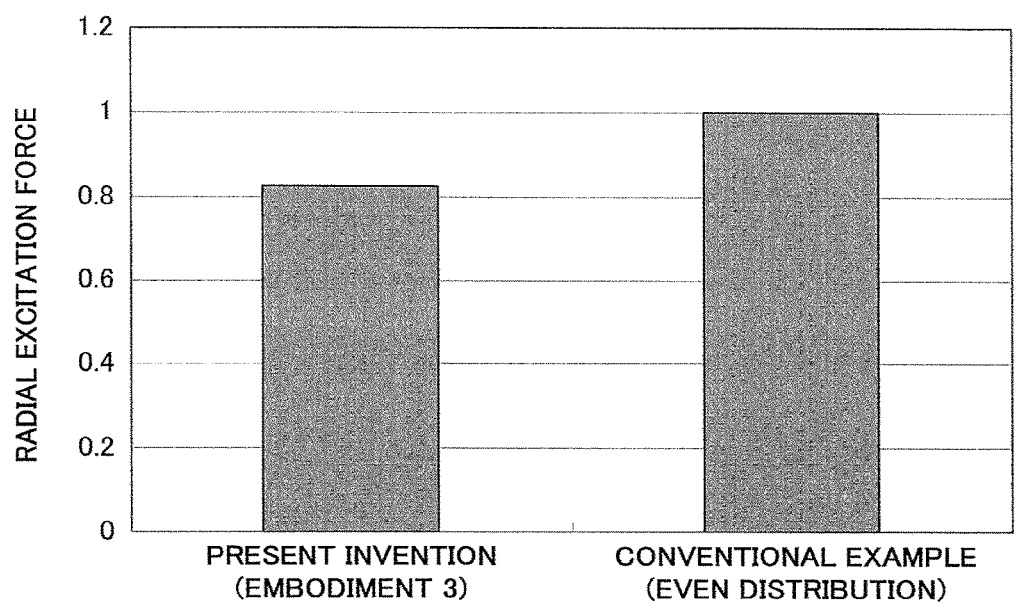
FIG. 8 illustrates the comparison of the radial excitation force generated when the rotor according to Embodiment 3 of the present invention is driven under a load with the result obtained with the conventional rotor.

FIG. 8 illustrates the comparison of the radial excitation force generated when the rotor 3 according to Embodiment 3 of the present invention is driven under a load with the result obtained with the conventional rotor. FIG. 8 confirms that the radial excitation force in the rotor 3 of Embodiment 3 is reduced with respect to that of the conventional rotor 3.

As indicated hereinabove, in Embodiment 3, the effect same as that of Embodiments 1 and 2 can be obtained even when the divisor (a) in the case of the number of poles p=8 is other than 4, or when the number Ns of stator slots is not equal to the number Nr of the rotor slots, or when the rotor slots have a different symmetry within the slot uneven arrangement period.

Embodiment 4

In Embodiments 1 to 3, the case of the induction machine 1 with the number of poles p=8 is considered. By contrast, in Embodiment 4, it is indicated that the effect same as that of Embodiments 1 to 3 can be obtained even when the number p of poles, the number Ns of the stator slots 22, and the number Nr of the rotor slots 32 are different from those in Embodiments 1 to 3.

Figure 9:
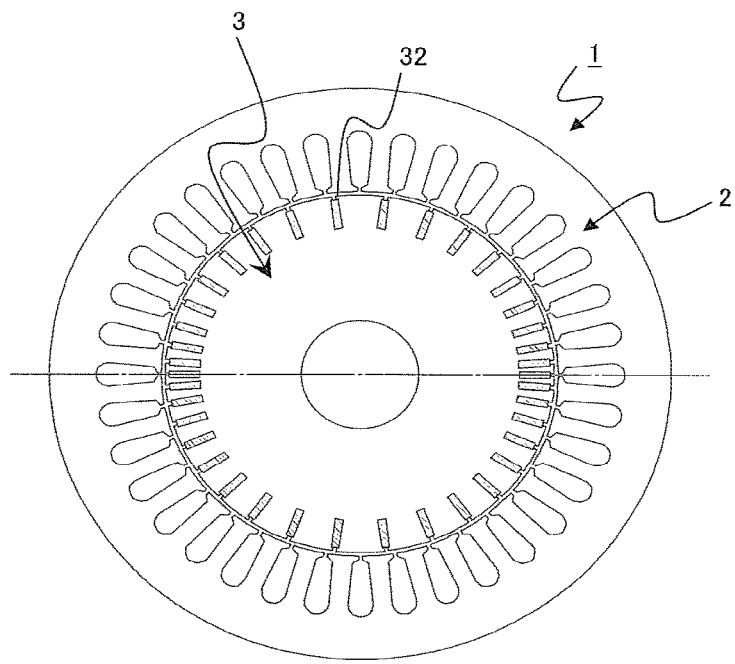
FIG. 9 is a cross-sectional exemplary view of the induction machine using the rotor according to Embodiment 4 of the present invention.

FIG. 9 is a cross-sectional exemplary view of the induction machine 1 using the rotor 3 according to Embodiment 4 of the present invention. A specific feature of the induction machine 1 depicted in FIG. 9 is that the number p of poles in the stator 2 is 6. It is also assumed that the number Ns of the stator slots 22 is 36 and the number Nr of the rotor slots 32 is 38. Other features are the same as in Embodiment 1.

Four divisors (a), namely, (1, 2, 3, 6) can be considered when the number of poles p=6, but the spatial order βmin corresponding to the minimum natural number among the spatial orders β of the radial excitation force, which are represented by Expression (4) above, is 2. Therefore, the specific spatial order of the radial excitation force in the induction machine 1 of Embodiment 4 is 2.

Thus, an effective method for reducing the radial excitation force with the spatial order of 2, is to make an uneven arrangement distribution of rotor slots 32 with respect to the rotation reaction of the rotor 3 within the slot uneven arrangement period (=180°) obtained by equally dividing one rotation period of the rotor 3 by the spatial order βmin=2.

In Embodiment 1, the slot uneven arrangement period is determined by assuming that the divisor (a) of the number p of poles is (a)=4, but the slot uneven arrangement period can be determined by specifying (a) by determining the spatial order βmin corresponding to the minimum natural number by using Expression (4) from the number p of poles, the number Ns of the stator slots 22, and the number Nr of the rotor slots 32 by the above-described calculation procedure described in Embodiment 4.

Figure 10:
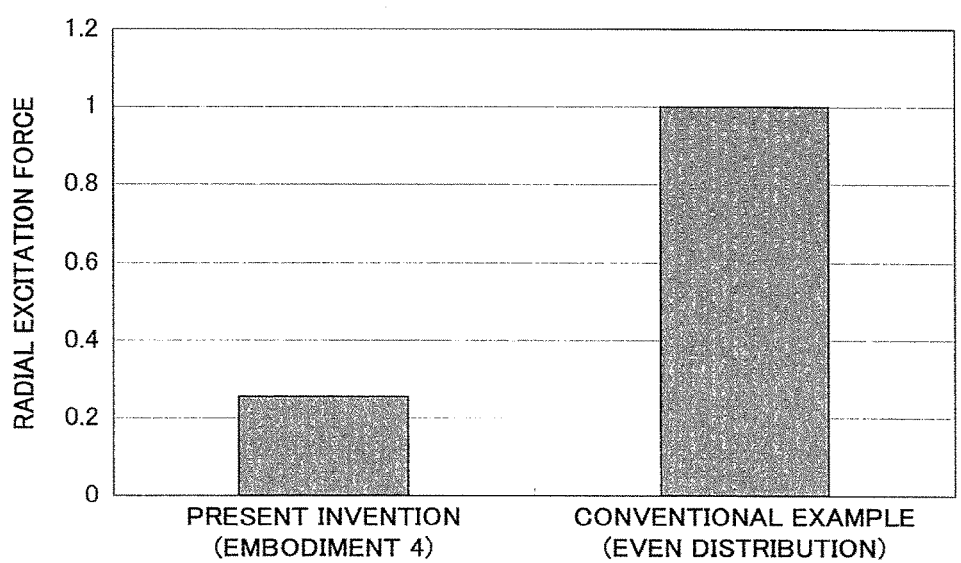
FIG. 10 illustrates the comparison of the radial excitation force generated when the rotor according to Embodiment 4 of the present invention is driven under a load with the result obtained with the conventional rotor.

FIG. 10 illustrates the comparison of the radial excitation force generated when the rotor 3 according to Embodiment 4 of the present invention is driven under a load with the result obtained with the conventional rotor. FIG. 10 confirms that in the rotor 3 of Embodiment 4, the radial excitation force is reduced by about 70% with respect to that of the conventional rotor 3.

As described hereinabove, according to Embodiment 4, even when the number p of poles, the number Ns of the stator slots, and the number Nr of the rotor slots are different from those of Embodiments 1 to 3, the same effect can be obtained.

Embodiment 5

In Embodiment 5, it is shown that the effect same as that of Embodiments 1 to 4 can be obtained even when rotor slots 32 of various shapes are used. Embodiments 1 to 4 illustrate the case in which the rotor slots 32 have a substantially rectangular shape. Embodiment 5 investigates the case in which the rotor slots 32 have a shape other than the substantially rectangular shape, and the effect of the shape of the rotor slots 32 is explained.

Figure 11:
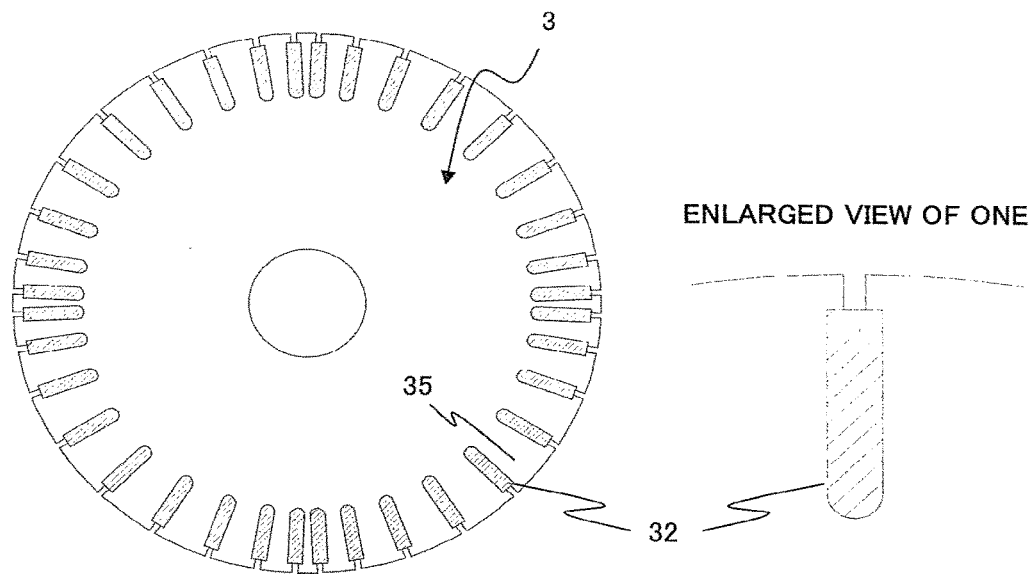
FIG. 11 is an enlarged cross-sectional view of the first rotor slot of the rotor according to Embodiment 5 of the present invention.
Figure 12:
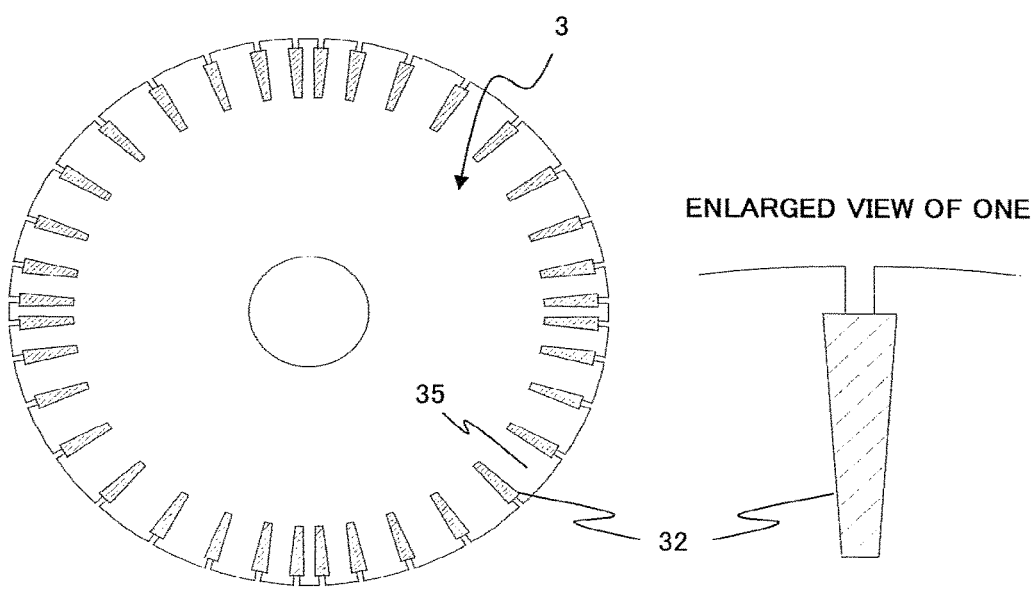
FIG. 12 is an enlarged cross-sectional view of the second rotor slot of the rotor according to Embodiment 5 of the present invention.

FIG. 11 is an enlarged cross-sectional view of the first rotor slot 32 of the rotor 3 according to Embodiment 5 of the present invention. FIG. 12 is an enlarged cross-sectional view of the second rotor slot 32 of the rotor 3 according to Embodiment 5 of the present invention. The rotor slots 32 depicted in FIG. 11 feature a circular-arc shape on the inner radius side. The rotor slots 32 depicted in FIG. 12 feature a substantially trapezoidal shape.

The radial excitation force having the spatial order such as described in Embodiment 1 is also generated when the rotor slots 32 have the shapes depicted in FIGS. 11 and 12, but the high-order component of the slot permeance is substantially determined by the arrangement of the rotor slots 32 and is not significantly affected by the slot shape. Therefore, even when the shape of the rotor slots 32 is different from a substantially rectangular shape, the radial excitation force can be reduced based on the principle explained in Embodiment 1.

By providing the rotor slots 32 with a circular-arc shape on the inner radial side or with a substantially trapezoidal shape, as depicted in FIGS. 11 and 12, it is possible to increase the minimum width of the rotor teeth 35. As a result, the magnetic flux can easily pass inside the rotor 3, magnetic saturation is moderated, and the noise of the induction machine 1 can be reduced without degrading the torque characteristic.

As indicated hereinabove, with Embodiment 5, the effect same as that of Embodiments 1 to 4 can be also obtained when the shape of the rotor slots is different from the substantially rectangular shape, and a slot shape that can reduce the noise of the induction machine, without degrading the torque characteristic, can be selected as appropriate.

Embodiment 6

Embodiments 1 to 5 illustrate an example in which the rotor slots 32 are arranged radially from the center axis of the rotor 3 in the radial direction. By contrast, in Embodiment 6, it is shown that the effect same as that of Embodiments 1 to 5 can be also obtained when the position of the rotor slots 32 on the inner radial side is changed in the rotation direction of the rotor 3.

Figure 13:
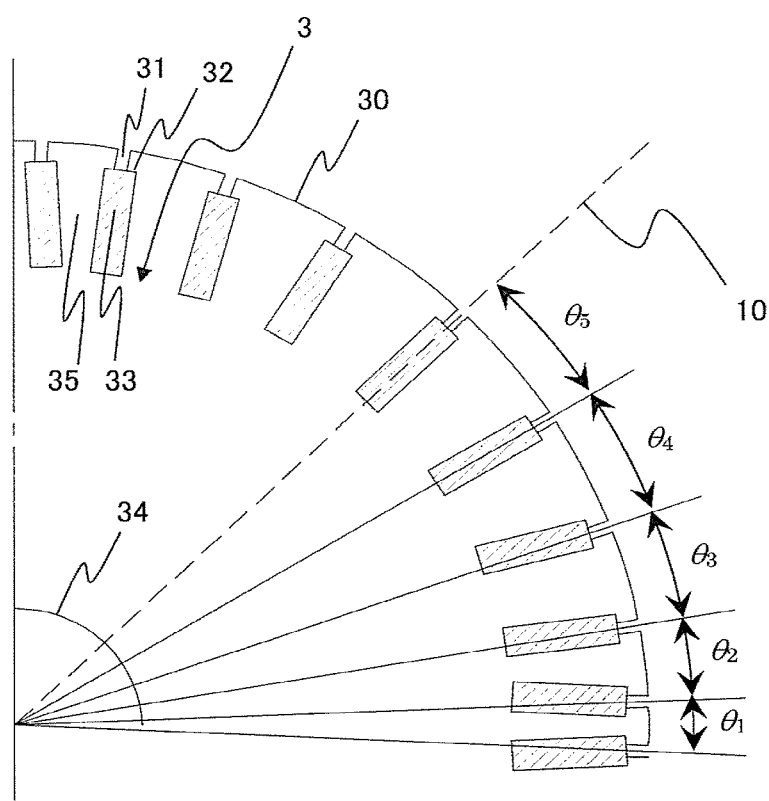
FIG. 13 is an example of a schematic cross-sectional view of the structure of the rotor according to Embodiment 6 of the present invention.

FIG. 13 is an example of a schematic cross-sectional view of the structure of the rotor 3 according to Embodiment 6 of the present invention. The rotor slots 32 depicted in FIG. 13 are imparted with an angle with respect to the radial direction by changing the position of the inner radial side in the rotation direction of the rotor 3 with respect to that in Embodiment 1, without changing the position of a rotor slot opening 31 on the outer side. Other shapes and features are the same as in Embodiment 1.

As indicated in Embodiment 1, a radial excitation force having spatial order components is generated in the rotor 3, but in this case, the high-order components of slot permeance are substantially determined by the arrangement of the rotor slots 32, and the effect of the arrangement decreases as the center axis of the rotor 3 is approached. Therefore, the radial excitation force can be also reduced when the rotor slots 32 are imparted with an angle with respect to the radial direction and the arrangement spacing of the rotor slots 32 on the inner radial side is made more even than on the outer radial side, while maintaining the uneven arrangement spacing of the rotor slots 32 on the outer radial side.

Since the minimum width of the rotor teeth 35 can be enlarged by making the arrangement spacing of the rotor 3 more even on the inner radial side than on the outer radial side, the magnetic flux can easily pass through inside the rotor 3, the magnetic saturation can be moderated, and the torque can be increased. As a result, the noise in the induction machine 1 can be decreased without degrading the torque characteristic.

As indicated hereinabove, with Embodiment 6, the effect same as that of Embodiments 1 to 5 can be obtained even when the positions of the inner radial sides of the rotor slots are changed in the rotation direction of the rotor, and the induction machine torque can be increased by making the arrangement spacing of the rotor slots more even on the inner radial side than on the outer radial side.

Embodiment 7

In Embodiment 7, a method for manufacturing the rotors 3 of Embodiments 1 to 5 is described.

Figure 14:
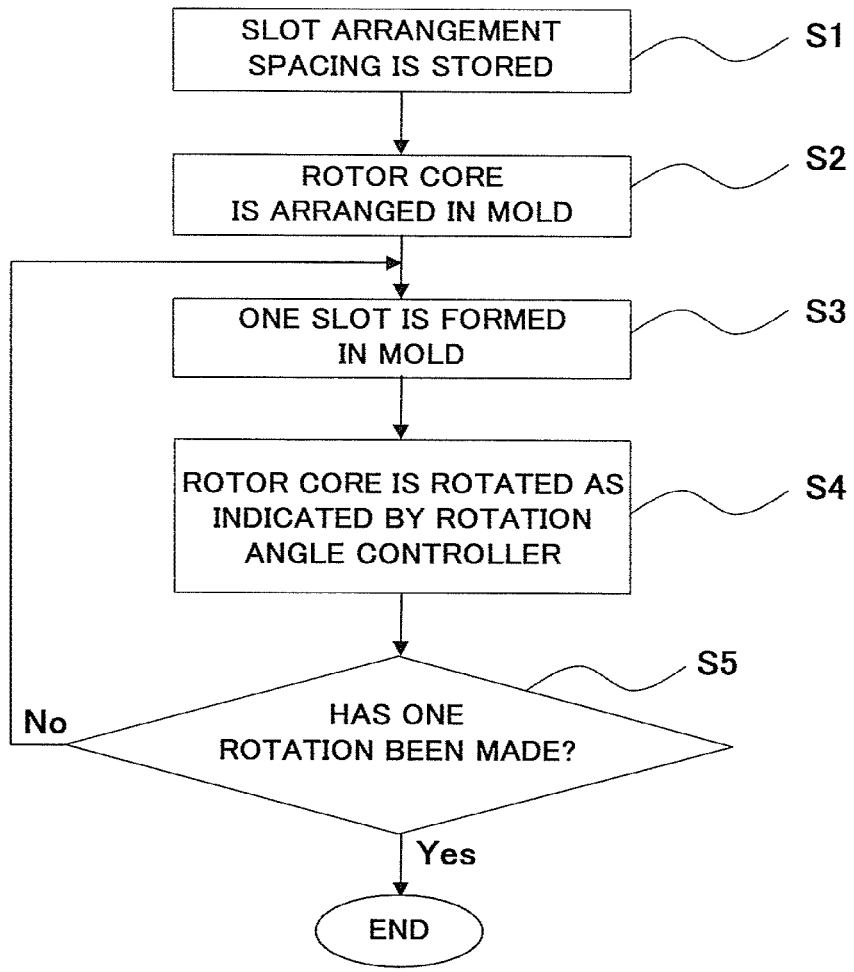
FIG. 14 is a flowchart illustrating the fabrication of the rotor according to Embodiment 7 of the present invention by a notching method.

FIG. 14 is a flowchart illustrating the fabrication of the rotor 3 according to Embodiment 7 of the present invention by a notching method. A method for producing in rotor 3 the rotor slots 32 with an uneven arrangement spacing that have the same shape and size as in Embodiments 1 to 5 will be explained hereinbelow with reference to FIG. 14.

In step S1, a rotation angle controller stores in advance in a storage unit an uneven arrangement spacing of the plurality of the rotor slots 32 which are to be formed on the outer circumferential portion of the stator 2. Instead of being stored in advance, the uneven arrangement spacing of the rotor slots 32 may be calculated, for example, according to a preset calculation formula in the subsequent step S4.

In step S2, a rotor core, which is the rotor 3 in a state before the plurality of the rotor slots 32 are formed, is arranged at an initial position with respect to a mold.

In step S3, one rotor slot 32 is formed in the rotor core by using the mold.

In step S4, the rotation angle controller indicates to the mold an angle corresponding to the arrangement spacing between the rotor slot 32 which has been initially formed and the rotor slot 32 which is next to be formed, on the basis of the uneven arrangement spacing stored in the storage unit. As a result, the rotor core is rotated through the angle indicated by the rotation angle controller.

In step S5, it is checked whether the rotor core has made one turn. The processing of steps S3 to S4 is repeated till the rotor core makes one turn. Once the rotor core makes one turn, the processing is ended.

A method for manufacturing the conventional rotor 3 in which the arrangement spacing of the rotor slots 32 is even corresponds to the case in which the rotation angle of the rotor core in step S4 is constant. Therefore, even when the rotor 3 is manufactured in which the arrangement spacing of the rotor slots 32 is uneven, the manufacturing process can be easily realized at a reduced cost, without significant changes in the conventional manufacturing line, by providing a rotation angle controller and changing the rotation angle of the rotor core in step S4.

As mentioned hereinabove, according to Embodiment 7, the method for manufacturing the rotors of Embodiments 1 to 5 can be easily realized at a reduced cost.

A method for manufacturing the rotor 3 is not limited to the above-described technique based on notching, and the rotor may be fabricated with an integral mold. The method using the integral mold can be easily adapted to the configuration in which the rotor slots 32 are arranged with an even arrangement spacing on the inner radial side of the rotor 3, as in the above-described Embodiment 6.

The invention claimed is:

1. A squirrel-cage rotor comprising:
a rotor including a plurality of rotor slots on an outer circumferential portion thereof and in which secondary conductors accommodated in the rotor slots rotate freely inside a stator as a result of interaction with a rotating magnetic field formed by the stator, wherein the plurality of rotor slots:
has the same shape and size; and
is configured such that an arrangement spacing thereof with respect to a rotation direction of the rotor is made uneven within a slot uneven arrangement period $(360/(a))°$ obtained by equally dividing one rotation period of the rotor by a divisor (a) of a number p of poles in the stator, wherein the divisor (a) is a minimum natural number among spatial orders $\beta$ represented by the following expression $$\beta = |As \cdot Ns + Ar \cdot Nr + k \cdot p|$$

wherein Nr is the number of the rotor slots of the rotor, Ns is the number of stator slots of the stator, p is the number of poles in the stator, As and Ar are arbitrary integers, and $k = -1, 0, 1$.

2. The squirrel-cage rotor according to claim 1, wherein the plurality of rotor slots is arranged to be mirror symmetrical with respect to a slot arrangement center line, which is an angular center of the slot uneven arrangement period, in the slot uneven arrangement period.

3. The squirrel-cage rotor according to claim 2, wherein the arrangement spacing of the rotor slots monotonously decreases or monotonously increases with an angle from the slot arrangement center line in the slot uneven arrangement period.

4. The squirrel-cage rotor according to claim 1, wherein the arrangement spacing of the rotor slots monotonously decreases or monotonously increases with an angle in the rotation direction of the rotor in the slot uneven arrangement period.

5. The squirrel-cage rotor according to claim 3, wherein the arrangement spacing of the rotor slots monotonously decreases or monotonously increases in an arithmetic or geometric series with an angle from the slot arrangement center line or with an angle in the rotation direction of the rotor, in the slot uneven arrangement period.

6. The squirrel-cage rotor according to claim 4, wherein the arrangement spacing of the rotor slots monotonously decreases or monotonously increases in an arithmetic or geometric series with an angle from the slot arrangement center line or with an angle in the rotation direction of the rotor, in the slot uneven arrangement period.

7. A method for manufacturing the squirrel-cage rotor according to claim 1, the method comprising:
storing in advance in a storage unit an uneven arrangement spacing of the plurality of rotor slots formed on an outer circumferential portion of the stator;
arranging a rotor core in a state before the plurality of rotor slots is formed, at an initial position with respect to a mold;
a one slot formation forming one of the rotor slots in the rotor core by using the mold;
a rotor core rotation rotating the rotor core through an angle corresponding to an arrangement spacing between the rotor slot which has been formed in the one slot formation and the rotor slot which is next to be formed, on the basis of the uneven arrangement spacing stored in the storage unit; and
repeating the one slot formation and the rotor core rotation through one rotation of the rotor core.

* * * * *